United States Patent [19]
Goeb et al.

[11] Patent Number: 6,015,040
[45] Date of Patent: Jan. 18, 2000

[54] TRANSFER DEVICE

[75] Inventors: Claude Goeb, Ostwald, France; Karl-Heinz Süss, Graben-Neudorf, Germany

[73] Assignee: Maschinenfabrik Polytype S..A., Fribourg, Switzerland

[21] Appl. No.: 08/736,934

[22] Filed: Oct. 25, 1996

[30] Foreign Application Priority Data

Oct. 27, 1995 [DE] Germany ............ 195 40 158

[51] Int. Cl.⁷ .................................. B65G 47/26
[52] U.S. Cl. ............. 198/438; 198/441; 198/476.1
[58] Field of Search ............... 198/418.1, 440, 198/441, 449, 450, 474.1, 476.1, 438; 131/282

[56] References Cited

U.S. PATENT DOCUMENTS

| | | | |
|---|---|---|---|
| 3,010,561 | 11/1961 | Ricke | 198/450 |
| 3,093,245 | 6/1963 | Worcester et al. | 198/474.1 |
| 3,286,809 | 11/1966 | Meinecke | 198/450 |
| 4,697,691 | 10/1987 | Zodrow et al. | 198/450 |

FOREIGN PATENT DOCUMENTS 40 10 601 C1  10/1991  Germany.

*Primary Examiner*—Joseph E. Valenza
*Attorney, Agent, or Firm*—McGlew and Tuttle

[57] ABSTRACT

A device for transferring objects, especially hollow bodies, such as cans, tubes and the like, from an arriving conveying device to an exiting conveying device. At least one rotatingly driven rotor is provided. At least one holding device, for the objects, is provided which is articulated with the rotor for common drive. At least one control device is provided connected to the holding device and is restrictedly guided along a cam to generate a nonuniform conveying velocity of the holding device. The holding device is mounted on the rotor pivotably around a pivot axis located at a spaced location from a rotor axis.

17 Claims, 5 Drawing Sheets ns and the

TRANSFER DEVICE

FIELD OF THE INVENTION

The present invention pertains to a device for transferring objects, especially hollow bodies, such as cans, tubes and the like, from an arriving conveying means to an exiting conveying means, with (a) at least one, rotatingly driven rotor, (b) at least one said holding means for holding the said objects, which is articulated to the rotor for common drive, and (c) at least one control means connected to the holding means, which control means is restrictedly guided along a cam to generate a nonuniform conveying velocity of the holding means.

BACKGROUND OF THE INVENTION

The conveying of objects frequently involves the problem that the objects must be transferred from a first conveying means to a second conveying means in order to change, e.g., the velocity or the position of the objects in relation to one another or both.

A drum-like device for transferring cans or tubes to be processed from a conveying means arriving at the device to a conveying means exiting from the device at another velocity has been known from DE 40 10 601 C1 for the automated manufacture of cans or tubes. The prior-art transfer device has a rotatingly driven rotor, to which a plurality of holding means for conveying the objects to be transferred are articulated. The articulation of the holding means is performed by means of a pivoted lever with guide rollers, which is rotatably mounted on the rotor and rotates around the rotor a-is during the rotation of the rotor and is restrictedly guided in the process along a cam arranged stationarily in relation to the machine. The holding means are fastened to the circumferential-side ends of rigid pivoting arms, which are mounted rotatably on the rotor axis, are coupled with the control means of the holding means via multilink transmissions to generate a nonuniform angular or rotation velocity of the holding means, and thus they rotate around the rotor axis. To securely hold the objects during the conveying through the transfer device, they are suctioned by the holding means.

A device for cutting and feeding cigarette filters has been known from U.S. Pat. No. 3,010,561. Multiple-length cigarette filters are delivered here by a dispenser onto a wheel equipped with cups on its circumference. The multiple-length cigarette filters are subsequently cut into three filter pieces of equal length. The filter-receiving cups arranged on the rotatable wheel are mutually adjustable in the circumferential direction and in the axial direction of the axis of rotation of the wheel, so that the individual receiving cups aligned next to one another can be adjusted and aligned one behind the other. Pivoted levers and cam rollers with cam plates that are in functional connection are used for adjusting the receiving cups in the circumferential direction. During the adjustment of the receiving cups around the axis of rotation of the wheel, the receiving cups mutually have nonuniform velocities depending on the design of the cam plates.

U.S. Pat. No. 3,286,809 pertains to a cutting and mixing-sorting device especially for cigarette filters. The device has a feed unit, from which the multiple-length cigarette filters are transferred to a conveying drum. The conveying drum is in functional connection with a cutting means, with which the multiple-length cigarette filters are cut into parts of equal length. Furthermore, the conveying drum is divided into one middle disk and two outer disks, wherein the middle disk has half-round recesses for receiving the middle part of the filter. The two outer drum disks are in functional connection with mutually and independently adjustable pivoted levers, which have semiround recesses for receiving the outer parts of the filter. Each multiple-length filter piece is cut on the receiving drum with a cutting means into a middle filter piece and two outer filter pieces. The cut filter parts, located next to one another, are delivered into a row one behind the other by means of pivoted levers, which are arranged movably on both sides of the receiving drum, in connection with the rotatable receiving drum, and they are at the same time displaced from the two outer drum disks onto the middle drum disk. The pivoted levers, designed as toggle levers, are controlled by cam plates or cams as a function of the rotation of the drum. To hold the individual filter bodies, holding shields are provided in the circumferential direction of the drum disks in the area of the filter-receiving cups, or vacuum can be admitted to the filter-receiving cups.

The primary object of the present invention is to design an inexpensive device with a rotor with at least one holding device supporting an object via a vacuum for conveyance from a conveying device running to the rotor to a conveying device running from the rotor such that a simple, compact device will be obtained.

According to the invention, a device for transferring objects is provided, especially hollow bodies, such as cans, tubes and the like, from an arriving conveying means to an exiting conveying means. The device includes at least one, rotatingly driven rotor, at least one holding means for the said objects, which is articulated to the said rotor for common drive, and at least one control means connected to the holding means, which control means is restrictedly guided along a cam to generate a nonuniform conveying velocity of the holding means. The holding means is mounted on the rotor pivotably around a pivot axis located at a spaced location from a rotor axis.

The present invention is based on a device for transferring objects from an arriving conveying means to an exiting conveying means, which has a rotatingly driven rotor, at least one holding means articulated to the rotor for common drive for conveying the objects from the arriving to the exiting conveying means, and a control means, which is connected to the holding means and is restrictedly guided to generate a nonuniform velocity of the holding means during the conveying of the objects to be transferred on the basis of a cam and carries the holding means with it in the process.

According to the present invention, the holding means is mounted at the rotor pivotably around a pivot axis, which does not coincide with the rotor axis but is located at a spaced location therefrom. As a result, the pivoting movement around the pivot axis located at a spaced location from the rotor axis, which pivoting movement is controlled by the control means, is superimposed to the rotary movement around the rotor axis. The holding means must be only accelerated or decelerated relative to the rotor corresponding to the velocity ratios in the transfer section. The number of transmission links between the control means and the holding means can be considerably reduced. While a multiarmed multilink transmission and additionally a pivoted lever are required according to the state of the art, the transfer device according to the present invention needs only one two-armed one-link transmission per holding means, and the rotor itself is a transmission link of the two-armed transmission.

A second transmission link, which is rigid in itself, is preferably mounted at the rotor pivotably around a pivot axis that is preferably parallel to the rotor axis. The second transmission link is preferably designed as a two-armed pivoted lever. A first arm of the pivoted lever, which is used as a support for the holding means, points in a radial direction to the rotor axis. A roller is preferably arranged as a control means at the second arm projecting from the holding means over the pivot axis. The control means is pressed by means of a restricted guiding means, preferably a compression-spring, against a machine-side cam, which is designed such that the desired velocity profile is achieved for the holding means.

Besides the simplification of the transmission mechanism, the device according to the present invention has the inherent advantage that the holding means can be connected to a vacuum source or can be supplied with a pressurized medium in a very simple manner. This is advantageous in the case of applications in which the objects to be transferred are held at or in the holding means by suction, supporting the reliable conveyance in the transfer section. In the opposite case, this also applies to applications which require a pressurized medium for support.

A fluid-tight connection of the holding means leads according to the present invention through its drag bearing. An especially simple and therefore preferred fluid connection is obtained if the holding means is arranged on a shaft around the pivot axis, which has an opening on one of its front sides, through which opening the holding means can be connected to a vacuum or pressure source. The fluid connection is thus performed according to the present invention via a single interface, at which two parts movable in relation to one another abut against one another. The two superimposed movements of the holding means, namely, the rotary movement of the first transmission link, of the rotor, and the pivoting movement of the second transmission link, the pivoted lever, are integrated according to the present invention in a single connection interface.

The rotor and a plate cam located opposite the rotor on the front side cooperate according to the present invention for the fluid connection in the manner of two distributing plate cams. In a partial area of its surface which is swept by the drag bearing or the shaft of the holding means, the plate cam arranged on the machine side has a recess, via which the holding means is connected to the vacuum source or the pressure source. The pivoting movement of the pivot shaft does not need to be taken into account here, in particular. In contrast, each holding means must be connected to a vacuiu source via two rotary connections according to the state of the art in order for the holding means to be able to perform a suction function, because the rotor must first be connected, and the holding means, which performs a relative movement in relation to the rotor, must then be connected from the rotor.

In a preferred embodiment, a device according to the present invention is used to transfer objects which are introduced by the arriving conveying means one after another and are removed by the exiting conveying means next to each other. In a preferred application, namely, in the manufacture of hollow bodies, especially tubes and cans, such a conveying problem arises, e.g., when the hollow bodies are to be dried in a drying or baking device, or a lacquer layer previously applied is to be baked in. The conveying velocity through the drier or through the oven is low in this case of application compared with the velocity at which the objects arrive because of the necessary exposure time. In order not to disturb the continuity of the entire manufacturing process, the hollow bodies introduced one after another are conveyed through the drier or the oven in groups located next to each other. The conveying velocity through the drier or the oven is reduced corresponding to the number of regrouped hollow bodies, i.e., in proportion to the hollow bodies introduced one behind the other to the hollow bodies forwarded next to each other.

The conveying means are usually horizontal conveyors, especially conveyor belts with conveying shells, in which the objects are located individually. However, the present invention is not limited to this. The transfer device is preferably formed by a so-called transfer drum.

A preferred exemplary embodiment of the present invention will be described below on the basis of figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
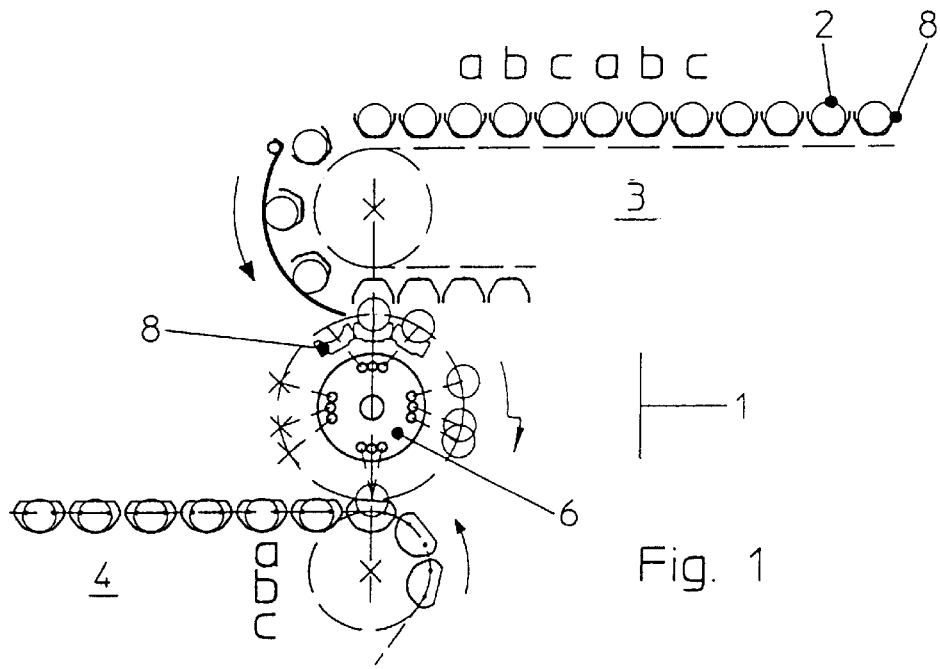
FIG. 1 is a side view of a device for transferring objects from an arriving to an exiting conveying means.

FIG. 1 shows the transfer of objects 2, which are delivered on an arriving conveying means 3, hereinafter called the arriving belt, to an exiting conveying means 4, which will hereinafter be called correspondingly the exiting belt, and which conveys the objects 2 further. A deflecting roller of the arriving belt 3 and a deflecting roller of the exiting belt 4 are arranged vertically one above the other together with a transfer device 1 arranged between them. The transfer device 1 is designed as a transfer drum in the exemplary embodiment.

During the conveying on the arriving belt 3, in the transfer section at the transfer drum 1 and on the exiting belt 4, the objects 2 are held one by one by holding means 8, conveying shells in the exemplary embodiment. The objects are introduced one after another on the arriving belt 3. This shall be indicated by the sequence a, b, c, wherein each letter designates a single object 2. The objects 2 are delivered in this sequence a, b, c into the area of a deflecting roller, opposite which a deflecting plate is arranged in the deflection area on the circumferential side to prevent the objects 2 from falling out of the conveying shells during the deflection. The deflecting plate extends approximately into an area of the deflecting roller which corresponds to a deflection by about 1800.

The rotatingly driven transfer drum 1 is arranged vertically under the deflecting roller of the arriving belt 3. Twelve conveying shells 8 rotate, distributed over the circumference of the transfer drum 4, in the exemplary embodiment. Supported by gravity, an object 2 to be transferred arrives from its conveying shell at the arriving belt 3, after leaving the area of the guide plate, in the conveying shell 8 of the transfer drum 1, which latter shell is located vertically under it at this moment. The object 2 is suctioned in at the same time to the conveying shell 8. Each of the conveying shells 8 of the transfer drum 1 is shaped such that the object 2 being held in it is centered. Furthermore, each of the conveying shells 8 is provided with a suctioning function, so that an object can be held in it immediately at the time of pickup and then in the transfer section even against the action of the centrifugal force.

This represents no fundamental problem in the case of the preferred use of the transfer device according to the present invention, namely, the transfer of hollow bodies, especially cans, tubes and the like. As far as the suctioning function of the conveying shell 8 of the transfer device is concerned, it is possible to resort to the conveying shells known from the state of the art.

The objects 2 are conveyed further in their corresponding direction of conveying at the time of the transfer to the transfer drum 1 and during the subsequent transfer to the exiting belt 4. In the course of a 180° turn of the transfer drum 1, the transfer section, three objects 2 introduced one behind the other and taken over one after the other in the sequence a, b, c are brought together at the same level when viewed in the direction of conveying, and they are transferred to the exiting belt 4 next to each other.

Figure 2:
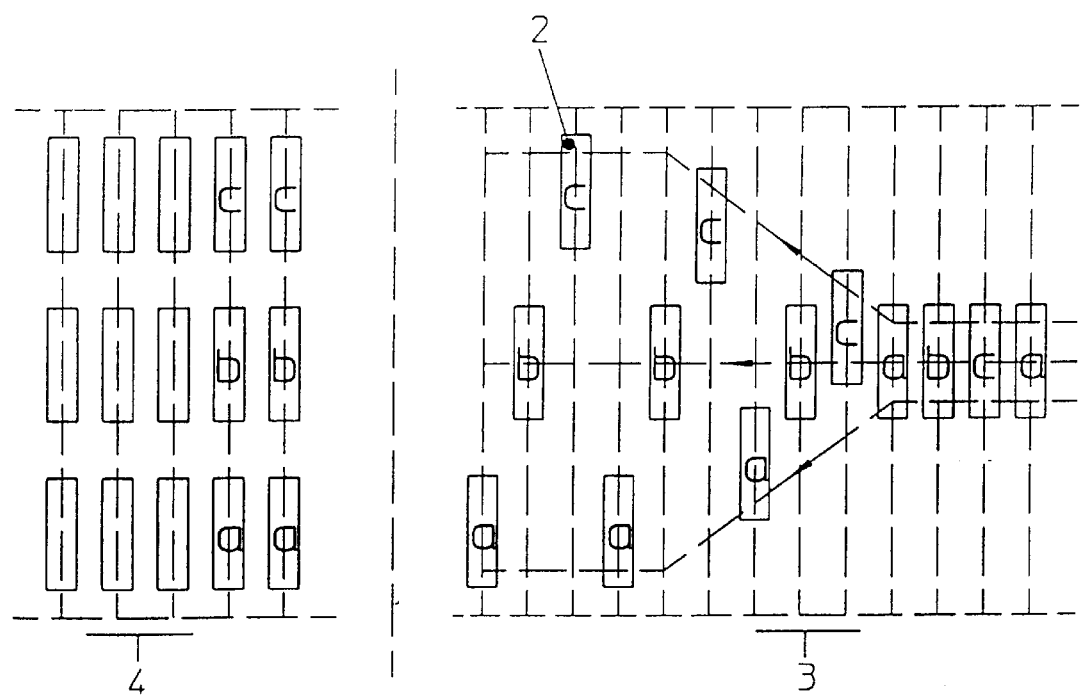
FIG. 2 is a top view of the arriving conveying means and of the exiting conveying means according to FIG. 1.

The top view of the arriving belt and exiting belt 3 and 4 shown in FIG. 2 shows the velocity and position compensation between the arrival and the removal, which is to be brought about by the transfer device of the exemplary embodiment. The objects 2 are first delivered on the arriving belt 3 in the sequence a, b, c at a velocity v first in one row one behind the other. Via correspondingly arranged distributing guides, the conveying shells, in which the objects are located, are first pulled apart on the arriving belt 3 at right angles to the direction of conveying, so that they are fed to the transfer device next to each other and offset one behind the other in their original pitch. Three objects 2 each are conveyed further on the exiting belt 4 in the exemplary embodiment next to each other and one behind the other in the pitch of the arriving belt 3, because the pitch of the conveying shells of the arriving belt is equal to that of the exiting belt. The velocity of the exiting belt 4 is correspondingly v/3. A plurality of objects 2 delivered one behind the other are thus to be brought by the transfer device to the same level when viewed in the direction of conveying, and they are additionally to be decelerated to a fraction of the velocity of the arriving belt 3.

As can be recognized from FIG. 1, twelve (12) conveying shells 8 are arranged distributed over the circumference of the transfer drum 1 for the purpose of this velocity and position compensation. The conveying shells 8 are integrated into groups of three, so that four such groups of three are arranged crosswise in relation to one another. The three conveying shells 8 of each of the four groups of three are located one behind the other in the direction perpendicular to the plane of the drawing.

Figure 3:
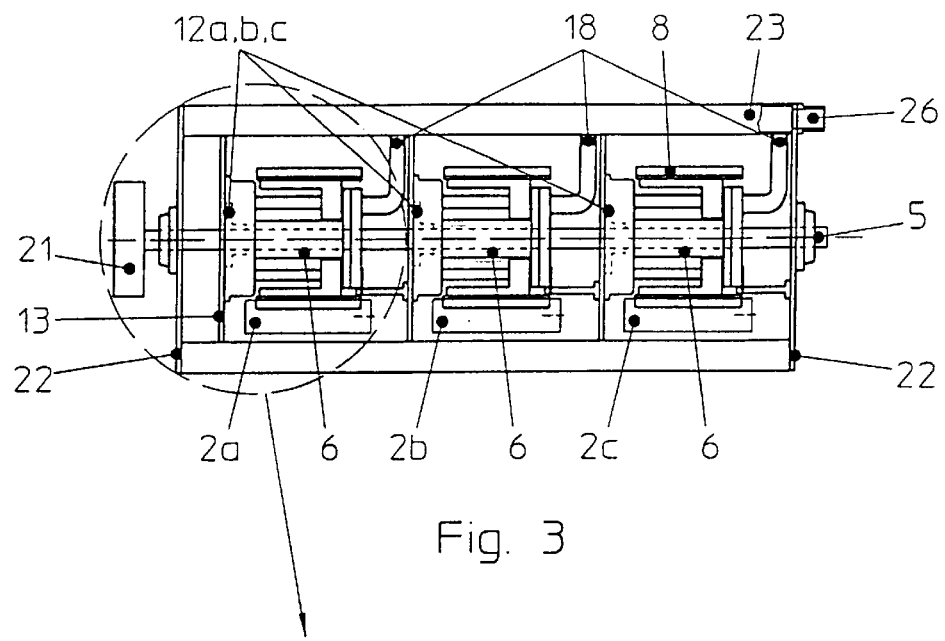
FIG. 3 is a longitudinal sectional view of the transfer device according to FIG. 1 with rotors arranged next to each other on a common shaft.

FIG. 3 shows the longitudinal section of the transfer drum 1. Three rotors 6, rotating in unison, are located next to each other on a common drive shaft 5 driven via a drive wheel 21. Four conveying shells 8 are pivotably articulated to each of the rotors 6. Three conveying shells 8 with objects 2a, 2b, 2c are located at precisely the same level, i.e., in the transfer position, immediately before the transfer to the exiting belt. Together with axial, peripheral support pipes 23, two outer cross members 22 assume a frame and support function for the transfer drum 1. In addition, a torque support 13, which in turn is arranged at the support pipes 23, are arranged on one front side of each rotor 6 each. Each of the conveying shells 8 can be connected to a vacuum source, not shown, via a common connection 26 and one fluid line 18 of the rotor each in order to hold the objects in the conveying shells 8 in the transfer section.

Figure 4:
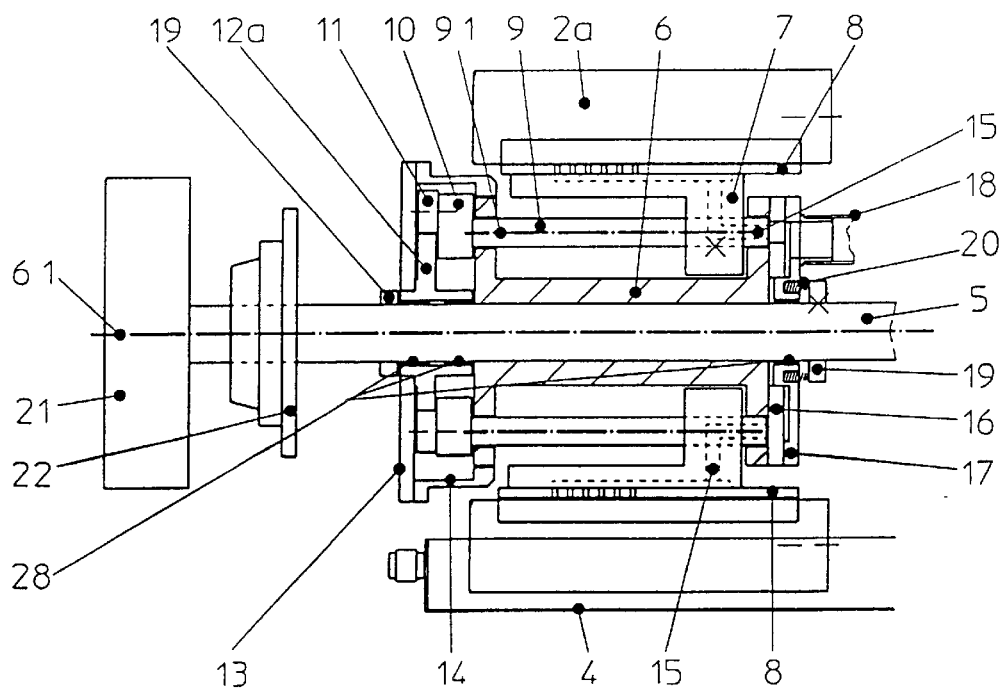
FIG. 4 is a sectional view of one of the rotors according to FIG. 3.

One of the rotors 6 is shown in detail as an example in FIG. 4. The rotor 6 has the shape of a cable drum with a central, sleeve-shaped part and two flanges. It is fastened on the drive shaft 5, rotating in unison. Pendulum shafts 9 are mounted at the rotor flanges; four pendulum shafts 9, rotatable around pivot axes 9.1 on both sides, are mounted in the exemplary embodiment shown. A support 7, to which a conveying shell 8 is attached, is mounted, rotating in unison, on each pendulum shaft 9. The pivot axes 9.1 are distributed uniformly over a reference circle of each rotor flange and are directed in parallel to the rotor axis 6.1.

At one end, at which the pendulum shaft 9 projects beyond one of its two rotary bearings, a roller lever is rigidly arranged at the pendulum shaft 9, and a guide roller 11, which runs on a stationary cam 12a during a rotation of the rotor 6, is fastened to the roller lever 10, rotating in unison. A pivoting movement of the support 7 is brought about by the restricted movement of the guide roller 11 via the roller lever 10. Corresponding to its function, the support will hereinafter be called a swivel arm 7. The cam 12a is jammed between the rotor flange and a support ring 19 and is fastened with its outer front side on the inside of the torque support 13. A sealing bell 14 protects the space in which the guide rollers 11 run on the cam 12a from contamination from the outside, i.e., in the radial direction to the drive shaft 5. The sealing bell 14 is fastened for this purpose with a flange front side on the inner front side of the torque support 13 and it seals the space on the circumferential surface of the opposite flange of the rotor 6.

A cam is associated with each group of pendulum shafts 9, which rotate with one of the rotors 6; there are three cams 12a, 12b, and 12c in the exemplary embodiment (FIG. 3). The cams 12a, 12b, 12c are shaped such that the circumferential velocity of the conveying shells 8 is decelerated from the velocity of conveying of the arriving belt 3 to the velocity of conveying of the exiting belt 4. The ascending movement of the conveying shells 8 rotating next to each other around the rotor axis 6.1 in the transfer section and their pulling apart in the section between the release of the objects and the pickup of subsequently arriving objects is superimposed to this common deceleration.

Figure 5:
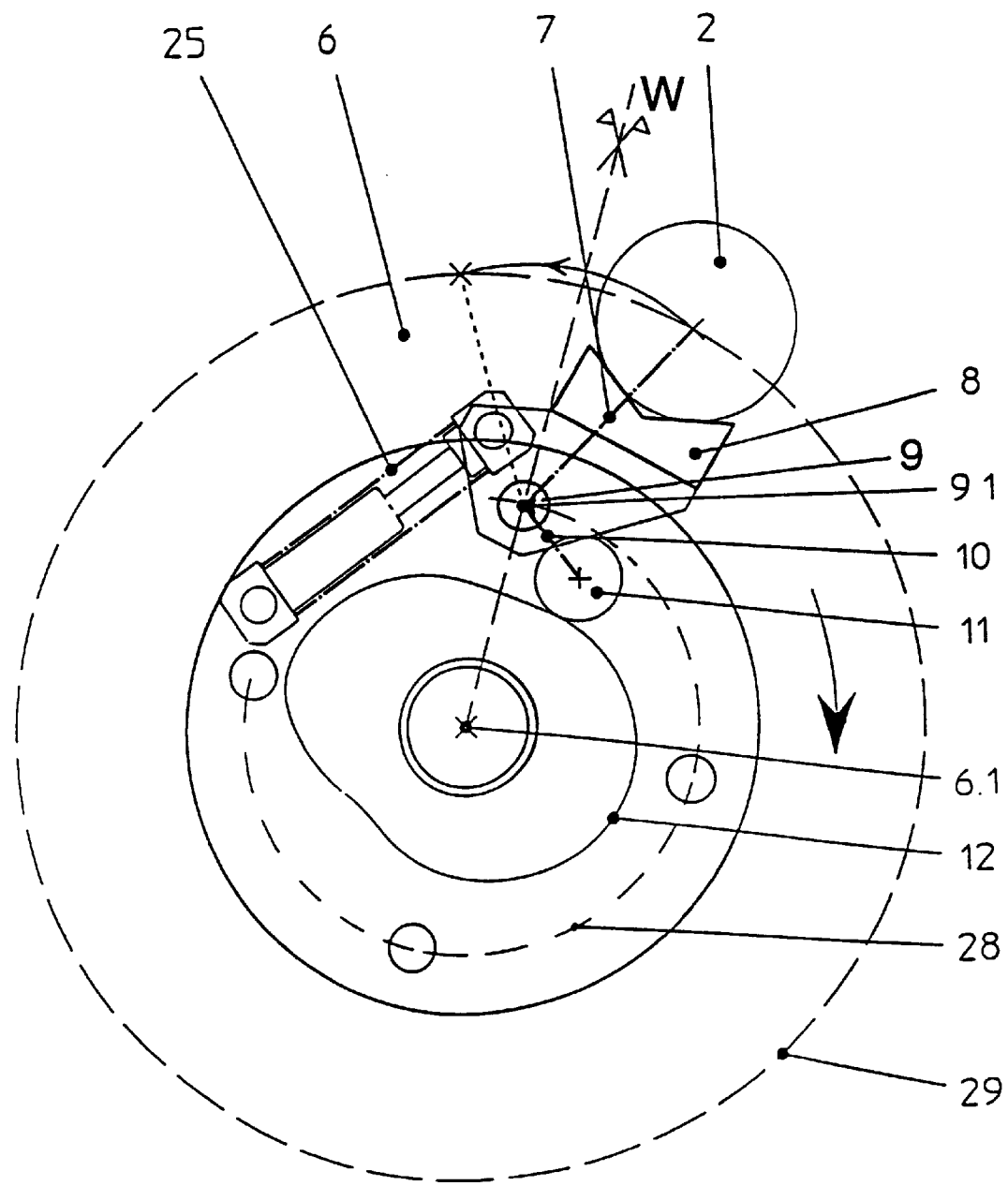
FIG. 5 is a representation of the principle of operation of the transfer device according to the present invention.

The transmission for generating the necessary nonuniform velocity of a conveying shell 8 is schematically shown in FIG. 5. The transmission comprises the rotor 6, the pendulum shaft 9 with the roller lever 10 and the guide roller 11, and the swivel arm 7. The rotor 6 rotates uniformly around its rotor axis 6.1. The pivot axis 9.1 of the pendulum shaft 9 pivotably mounted at the two rotor flanges is now restricted to move on a reference circle 28 around the rotor axis 6.1. The swivel arm 7 and the roller lever 10 as a lever arm therefor form together a pivoted lever with a pivot axis 9.1. The swivel arm 7 and the roller lever 10 are arranged rigidly in relation to one another. FIG. 5 shows all pivot axes 9.1 along the common reference circle 28, and each of the pivot axes of one group of three conveying shells 8, which pivot axes are spaced comparatively close to one another, is formed at one of the three rotors.

The connection line between the pivot axis 9.1 and the rotational bearing for the guide roller 11 at the roller lever 10 and the connection line between the pivot axis 9.1 and the longitudinal axis of an object 2, which has a round cross section in the exemplary embodiment, i.e., the effective swivel arm, are directed essentially at right angles to one another. The guide roller 11 is pressed by a compression spring 25, which is fastened to the rotor 6 with one of its ends and to the swivel arm 7 with its other end, against the cam 12. It is also possible to take other measures known from the state of the art to bring about a restricted guiding of the guide roller 11 along the cam 12. A second velocity, namely, that of the pivoting movement, is superimposed to the constant velocity of rotation of the rotor 6 due to the pivoting movement of the holding means swivel arm 7 around its pivot axis 9.1, so that the conveying shell 8 with the object 2 held in it moves at a higher or lower velocity compared with the velocity of the rotor. Due to the shape of the cam 12, the effective length of the swivel arm 7, the length of the roller lever 10, and the arrangement of the roller lever 10 at the swivel arm 7, the velocity of the conveying shell 8 can be varied within wide limits corresponding to the particular use.

Figure 6:
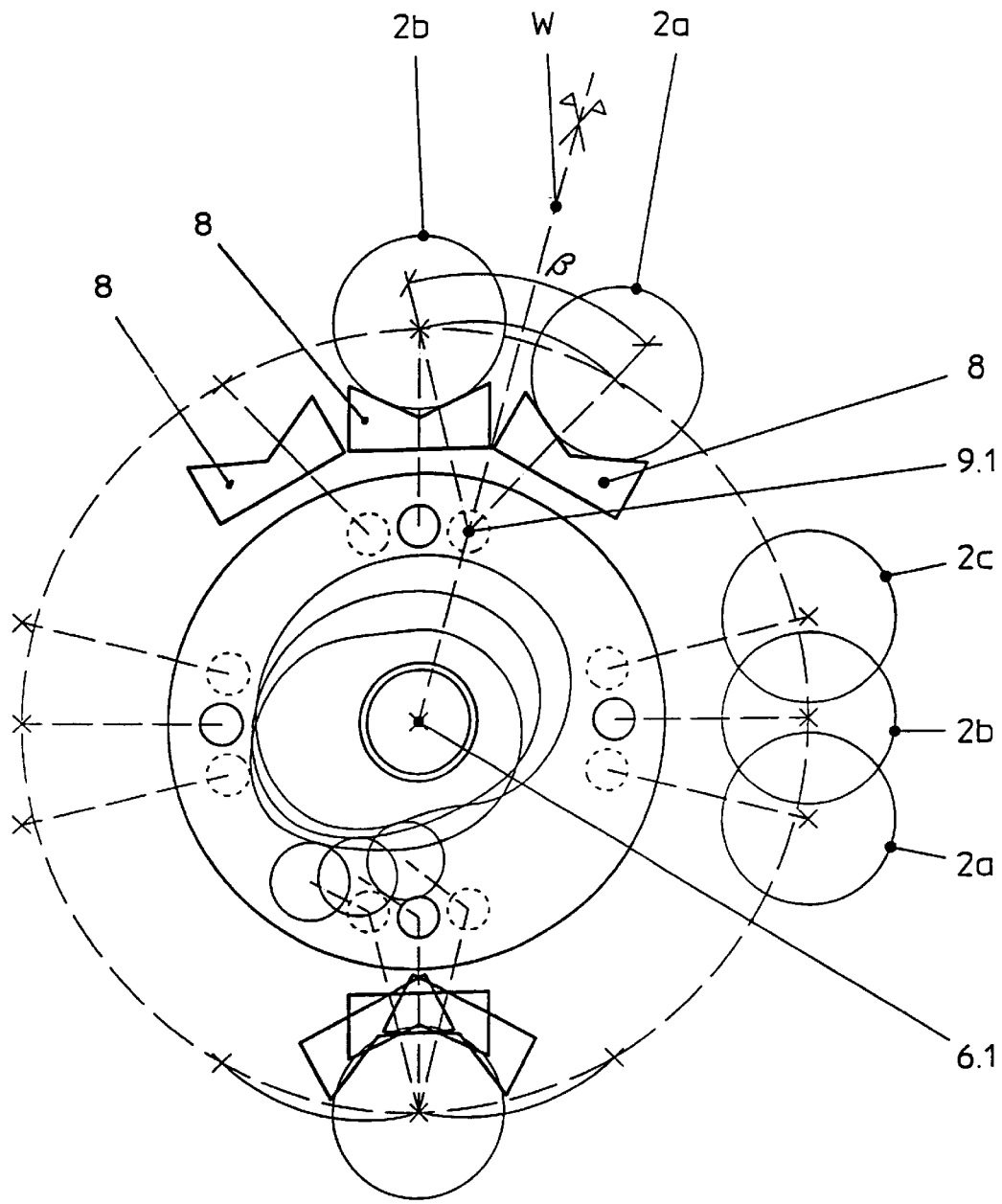
FIG. 6 is a representation of the synchronization of a plurality of holding means rotating one after another around a rotor axis for the objects.

FIG. 6 shows the transfer drum 1 with its total of 12 conveying shells 8 at the moment of the transfer of an arriving object and the simultaneous transfer of three objects 2 to the exiting belt 4. FIG. 6 shows only the relative movements of the conveying shells 8 in relation to one another. The common deceleration of the velocity of removal is still to be superimposed to these relative movements. A target circle connects such reference points or reference axes of the objects 2 to one another, e.g., the central longitudinal axes of round cans, which shall be caused to coincide with one another for transfer to the exiting belt 4. Reference axes can be determined differently according to suitable criteria in the case of other cross-sectional shapes.

The three conveying shells 8 to be brought together have the same pitch from one another during the taking over of the objects 2 from the arriving belt 3 as the arriving belt 3. Until transfer to the arriving belt, a leading conveying shell 8 is pivoted back relative to a middle conveying shell 8, and a trailing conveying shell 8 is pivoted forward corresponding to the middle conveying shell 8, so that these three conveying shells 8 coincide in the representation shown in FIG. 6 during transfer to the exiting belt 4. The leading and trailing conveying shells 8 are pivoted for this purpose by an angle $\beta$ around their pivot axes 9.1 relative to the middle conveying shell 8. In order for the reference axes of the objects 2a, 2b and 2c located at the same level to cover each other during transfer, the effective lengths of the swivel arms 7 of the leading and trailing conveying shells 8 are somewhat longer than that of the middle conveying shell 8. The angle bisectrix W of the relative pivoting movement around the pivot axis 9.1 coincides with the angle bisectrix of the two connecting lines between the rotor axis 6.1 and the reference axes of the leading and trailing conveying shells 8, so that the reference axes are located on the target circle 29 during pickup and release.

Figure 7:
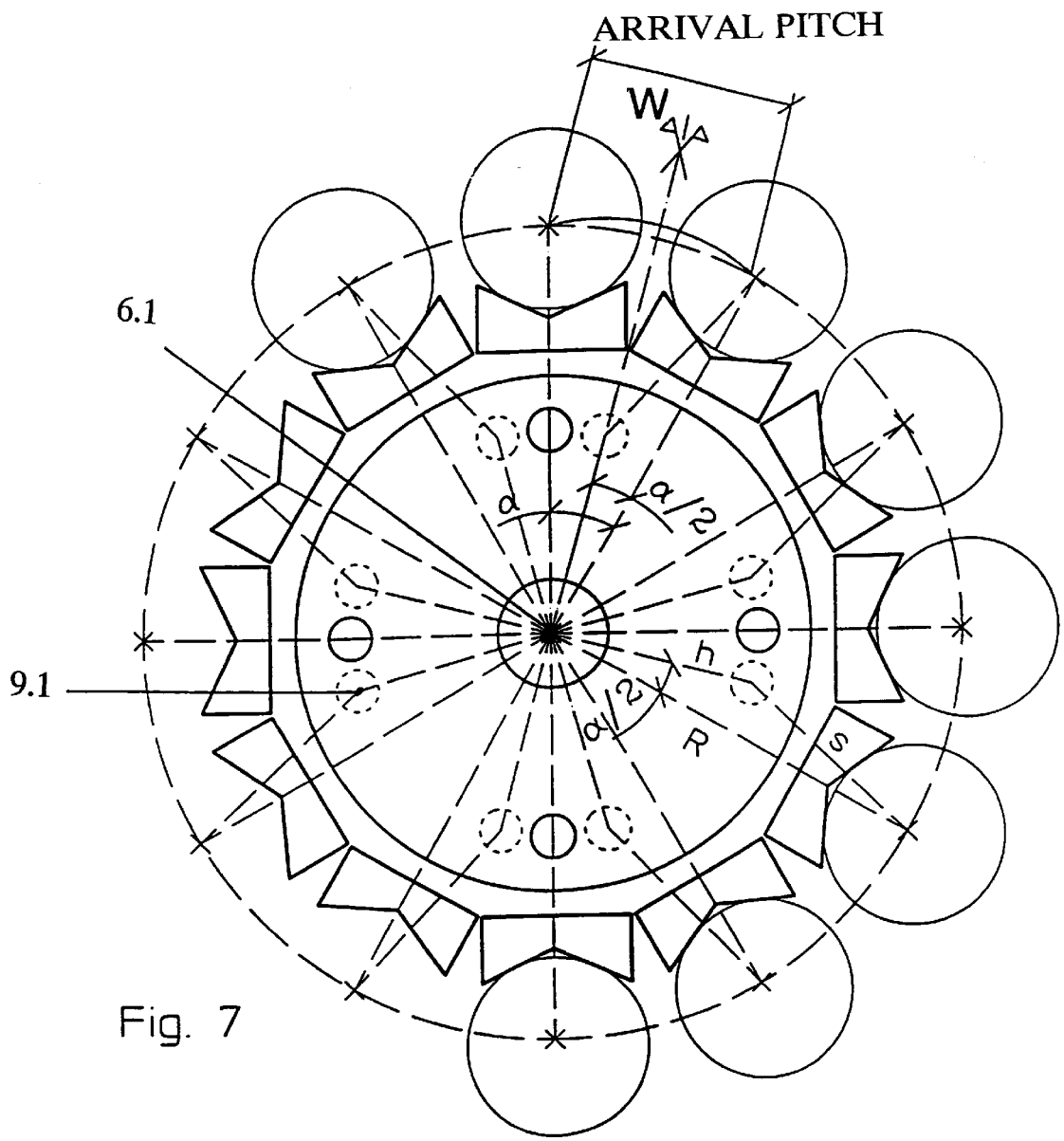
FIG. 7 is a representation of the leverages of the transfer device according to the present invention.

FIG. 7 shows the leverages for the transfer drum of the exemplary embodiment, in which the 12 conveying shells are shown in fictitious positions one under the other without velocity compensation. The pitch angle $\alpha$ is correspondingly 30° in the case of 12 rotating conveying shells. For velocity compensation, the leading and trailing conveying shells (FIG. 6) are pivoted back and forth, respectively, by this pitch angle $\alpha$ around the rotor axis 6.1 when viewed in the direction of rotation. The radius R of the circle connecting the reference points of the hollow bodies is proportional to the product of the pitch predetermined by the arrival and the number of rotating conveying shells (pitch *12)/$2\pi$. The distance h between the pivot axes 9.1 and the rotor axis 6.1 is due to transmission engineering reasons, and it is determined especially by the dimensions of the cam. The length s of the effective swivel arm, i.e., the distance between the reference points of the hollow bodies and their pivot axes 9.1, is finally obtained from R, h and $\alpha/2$.

Besides the reduction in the transmission design effort, the transfer device according to the present invention has the synergistic effect that the fluid connection for the conveying shells 8 can be considerably simplified by uniting two rotary connections of a fluid connection, namely, the connection to a vacuum source in the exemplary embodiment, in the drag bearing of the pendulum shaft 9.

As can be recognized from FIG. 4, a cam 16 is stationarily arranged facing the front side of the rotor flange, which rotor flange faces away from the cam 12. The outer, flat front side of the rotor flange slides over the flat front side of the cam 16 facing it. This is followed by an end piece 17 which preferably applies some pressure to the cam 16 via a spring applied against another support ring 19. The plate 17 also has a passage and this passage is connected to the fluid line 18. A recessed channel, which is used as a control groove for establishing the connection to the vacuum source, is provided in the cam 16 in a partial area, semicircularly over half of the control side (cam) 16 in the exemplary embodiment. During the rotary movement of the rotor 6, the pendulum shafts 9 of the swivel arm 7 sweep over the recessed channel of the cam 16 from the taking over of an object from the arriving belt 3 until the transfer to the exiting belt 4.

Each of the pendulum shafts 9 has, in turn, an inner fluid channel 15 opening on the front side of the pendulum shaft 9, and the said fluid channel is extended from this opening through the pendulum shaft 9 and the swivel arm 7 to the conveying shell 8. A connection to the vacuum source is established in a simple manner by the front-side opening of the pendulum shaft 9 sweeping over the channel at the cam 16 during a rotation of the rotor 6, i.e., by the rotor flange and the cam 16 acting in the manner of two otherwise sealing valve disks in relation to one another.

While a specific embodiment of the invention has been shown and described in detail to illustrate the application of the principles of the invention, it will be understood that the invention may be embodied otherwise without departing from such principles.

What is claimed is:

1. A device for transferring objects from an arriving conveying means to an exiting conveying means, the device comprising:

a rotatingly driven rotor having a rotor axis;

holding means for holding said objects, said holding means being articulated to said rotor for common drive, said holding means being arranged mounted on a pendulum shaft of said rotor pivotably around a holding means pivot axis located at a spaced location from said rotor axis, said shaft having an opening for a fluid connection on a front side, said holding means being connected to a vacuum source through said opening to establish a vacuum to hold said objects on said holding means;

a cam; and control means connected to said holding means, said control means being restrictedly guided along said cam to generate a nonuniform conveying velocity of said holding means.

2. A device in accordance with claim 1, further comprising a swivel arm mounted rotatably around said holding means pivot axis, said holding means being fastened to said swivel arm, said swivel arm being restricted by said control means, connected to said swivel arm, to perform a pivoting movement during a rotation around said rotor axis.

3. A device in accordance with claim 2, further comprising a lever arm, said control means being fastened to said lever arm, said lever arm being rigidly connected to said swivel arm.

4. A device in accordance with claim 1, wherein:

said lever arm projects over said holding means pivot axis when viewed from said holding means and points substantially at an angle toward said swivel arm; said swivel arm and said lever arm form a pivoted lever; and said control means is arranged adjacent to said lever arm.

5. The device in accordance with claim 1, further comprising a cam plate with a channel, said cam plate being arranged on a side of said rotor and positioned wherein during a rotation of said rotor, said opening of said pendulum shaft sweeps over said channel via which said holding means is connected to the vacuum source.

6. The device in accordance with claim 1, wherein at least two said rotors are arranged next to one another along a common said rotor axis and a plurality of said pendulum shafts are arranged coaxially to said rotor axis and are supported in each of said rotors.

7. The device in accordance with claim 1, wherein a restricted guidance of said control means is provided in a nonpositive manner.

8. The device in accordance with claim 1, wherein a first plane through said pivot axis of said pendulum shaft and said rotor axis forms a an angle bisectrix (W) with a second plane through the object adjacent to the pendulum shaft during the takeover from the arriving conveying means and with said rotor axis.

9. A device for transferring objects from an arriving conveying means to an exiting conveying means, the device comprising:

a rotor shaft defining a rotor axis;

a rotatingly driven rotor fastened to said rotor shaft for rotating in unison with said rotor shaft about said rotor axis, said rotor including a pendulum shaft defining a holding device pivot axis located at a spaced location from said rotor axis;

a holding device articulated to said rotor for rotation with said rotor, said holding device being arranged mounted pivotably on said pendulum shaft of said rotor for pivotal movement around said holding device pivot axis, said pendulum shaft having an opening for a fluid connection on a front side, said holding device being connected to a vacuum source through said opening to establish a vacuum to hold said objects on said holding device;

a cam; and a control element connected to said holding device, said control element being restrictedly guided along said cam to generate a nonuniform conveying velocity of said holding means.

10. A device in accordance with claim 9, further comprising a swivel arm mounted rotatably around said holding device pivot axis, said holding device being fastened to said swivel arm, said swivel arm being restricted by said control element, connected to said swivel arm, to perform a pivoting movement during a rotation around said rotor axis.

11. A device in accordance with claim 10, further comprising a lever arm, said control element being fastened to said lever arm, said lever arm being rigidly connected to said swivel arm.

12. A device in accordance with claim 9, wherein:

said lever arm projects over said holding device pivot axis when viewed from said holding device and points substantially at an angle toward said swivel arm;

said swivel arm and said lever arm form a pivoted lever; and said control element is arranged adjacent to said lever arm.

13. The device in accordance with claim 9, further comprising a cam plate with a channel, said cam plate being arranged on a side of said rotor and positioned wherein during a rotation of said rotor, said opening of said pendulum shaft sweeps over said channel via which said holding device is connected to the vacuum source.

14. The device in accordance with claim 9, wherein at least two said rotors are arranged next to one another along a common said rotor axis and a plurality of said pendulum shafts are arranged coaxially to said rotor axis and are supported in each of said rotors.

15. The device in accordance with claim 9, wherein a restricted guidance of said control element is provided in a nonpositive manner.

16. The device in accordance with claim 9, wherein a first plane through said pivot axis of said pendulum shaft and said rotor axis forms a an angle bisectrix (W) with a second plane through the object adjacent to the pendulum shaft during the takeover from an incoming conveying means and with said rotor axis.

17. A device for transferring objects from an arriving conveying means to an exiting conveying means, the device comprising:

a rotatingly driven rotor having a rotor axis;

holding means for holding said objects, said holding means being articulated to said rotor for common drive, said holding means being mounted on said rotor pivotably around a holding means pivot axis located at a spaced location from said rotor axis;

a cam; and control means connected to said holding means, said control means being restrictedly guided along said cam to generate a nonuniform conveying velocity of said holding means, wherein said holding means is arranged on a shaft rotatable around said holding means pivot axis, said shaft having an opening for a fluid connection on a front side, and the said holding means is connected to a vacuum source through said opening in order to hold said objects on said holding means by means of vacuum.

* * * * *